March 20, 1945.  H. E. KENNEDY ET AL  2,371,894
ELECTRIC WELDING
Filed July 31, 1943
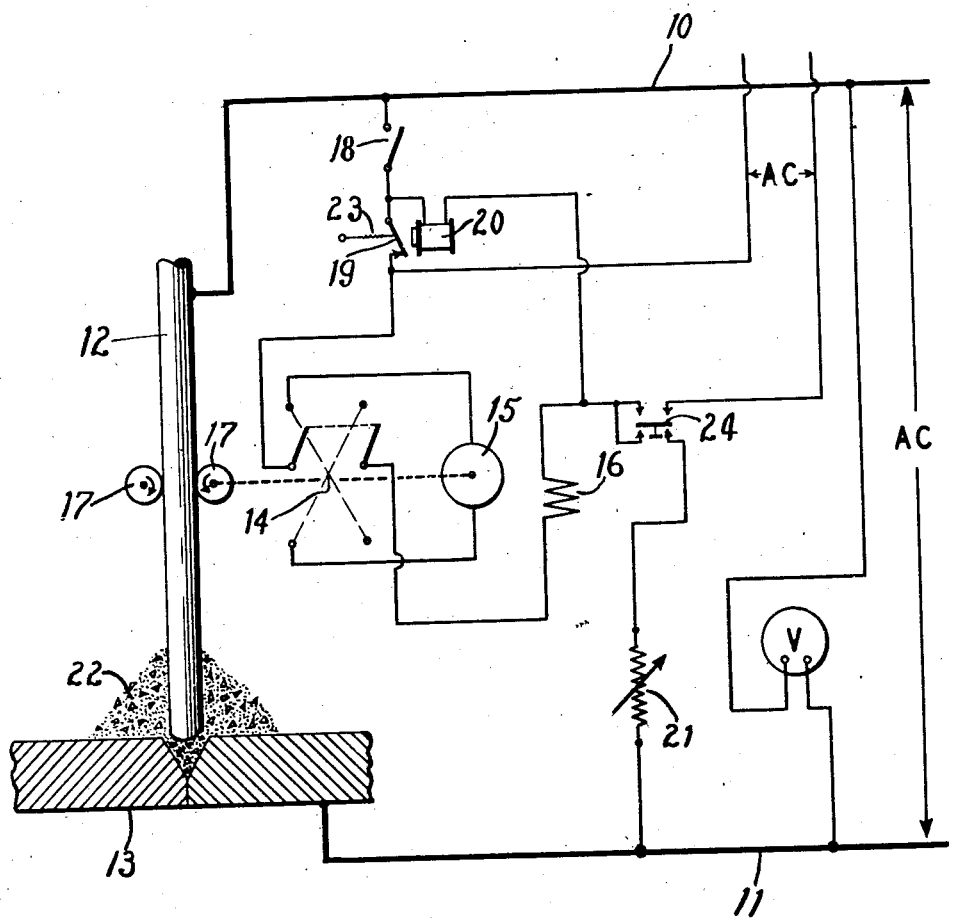
INVENTORS
HARRY E. KENNEDY
MAYNARD A. ROTERMUND
BY *E. Greenewald*
ATTORNEY Patented Mar. 20, 1945

2,371,894

UNITED STATES PATENT OFFICE 2,371,894

ELECTRIC WELDING

Harry E. Kennedy, Berkeley, and Maynard A. Rotermund, Walnut Creek, Calif., assignors to The Linde Air Products Company, a corporation of Ohio Application July 31, 1943, Serial No. 496,850

3 Claims. (Cl. 314—73)

This invention relates to electric welding and refers more particularly to an improved, simplified control system for regulating the rate of electrode feed in automatic electric welding processes. Although the invention is useful in all automatic electric welding operations, it is particularly well suited for use in connection with the process described in United States Patent No. 2,043,960 when alternating current is used. In that process metal from a welding electrode is melted and deposited on a workpiece under an infused blanket of an initially comminuted mineral-like welding composition and through a molten pool of such composition established at the weld zone.

In electrical welding operations of the type in which a welding current is passed between a pair of relatively movable electrodes, one of which may be a workpiece to be welded and the other of which may be a rod or wire composed of metal to be fused and deposited on the workpiece, whether or not the welding be done by the process of the patent above referred to, it is desirable to maintain a constant distance between the electrodes. When this distance is maintained at a fixed value, the voltage drop between the electrodes remains substantially constant. Thus the welding current remains constant and the resulting weld is uniform throughout its length.

Generally in such operations the consumable welding electrode from which metal is to be deposited on the workpiece electrode is caused to be fed toward the workpiece electrode, as it is consumed, by driving rolls actuated by an electric motor and to maintain a substantially constant distance between the fusing end of the welding electrode and the workpiece electrode, it is customary to utilize some characteristic of the welding voltage or current to control the speed of the motor. Heretofore the conventional means for maintaining and regulating the motor speed and rate of electrode feed involved the use of relays, vacuum tubes, photoelectric cells and the like, together with complicated and costly associated circuits and apparatus. While excellent control has been attained with such systems, they are subject to disadvantages such as high cost, limited service life, and fragility.

The present invention has for its principal object a control system for automatic electric welding operations, which system is free of the disadvantages of prior control systems.

In the accompanying drawing, the single figure is a diagrammatic representation of a control system embodying the invention.

Generally, the objects of the invention are attained by connecting a high speed, universal, series wound motor across the welding electrode and the workpiece electrode and employing this motor to drive the electrode feed means. This type of motor is of such ample power that its speed is little influenced by variations in torque occasioned in feeding the electrode, and its speed is therefore substantially entirely dependent upon welding circuit voltage. A variable resistance connected in series with the motor is included in the circuit so that the electrode feed may be set initially at a desired rate, and an over-voltage protective device, such as a fuse, circuit breaker or over-voltage relay is provided to protect the motor from over-voltage produced by open circuit voltage of the welding current supply. The source of welding current may be either a transformer, when alternating current is used, or a welding generator, when direct current is used.

Referring to the drawing, a pair of conductors 10, 11 is connected to a consumable metal welding electrode 12 and a workpiece electrode 13 such as metal plates to be joined and to a suitable source (not shown) of alternating welding current. Connected across the conductors 10, 11 through a reversing switch 14, having a function explained below is a high speed universal motor 15 having a series field winding 16 and adapted to operate on alternating or direct current. The motor 15 is operatively associated by suitable means, not shown, with driving rolls 17 adapted to feed the electrode 12 to the workpiece electrode 13 as the former is consumed. A switch 18 is provided for the motor 15 and an over-voltage relay, the contacts 19 of which are in series with the motor and the coil 20 of which is connected across the electrodes 12, 13, is also provided to protect the motor 15 from damage by over-voltage. For adjusting the rate of feed of the electrode 12 to the workpiece electrode 13, a variable resistance 21 is included in the circuit. A voltmeter is connected across the conductors 10, 11. If the welding operation is to be conducted by the process of Patent No. 2,043,960, the welding zone is blanketed with a layer 22 of a welding composition of the type described in that patent.

In conducting an automatic electric welding operation using the control system illustrated in the drawing, welding current is passed through the circuit, and the variable resistance 21 is adjusted so as to provide a desired rate of speed of the motor 15 and consequently a desired rate of feed of the welding electrode 12 to the workpiece electrode 13. So long as the distance between the fusing tip of the electrode 12 and the workpiece electrode 13 remains constant, the speed of the motor 15 and the rate of feed of the electrode 12 remain constant. If the distance between the fusing tip of the electrode 12 and the workpiece electrode 13 is decreased, the voltage drop between the electrodes is decreased, and the speed of the motor 15 is decreased, thereby decreasing the rate of feed of the electrode 12. If the distance between the fusing end of the electrode 12 and the workpiece electrode 13 is increased, the voltage drop between the electrodes is increased, and the speed of the motor 15 is increased, thereby increasing the rate of feed of the electrode 12. If during the welding operation the electrode 12 should make contact with the workpiece electrode 13 and thereby permit the voltage between the electrodes to rise to the full open-circuit voltage of the current source, the coil 20 of the over-voltage relay becomes energized sufficiently to open the contacts 19 against the tension of the spring 23, thereby cutting the motor 15 out of the circuit and protecting it from damage.

The control system of the invention thus serves to maintain a substantially uniform welding voltage by maintaining substantially constant the distance between the fusing end of the electrode 12 and the workpiece electrode 13, and by automatically correcting variations in the distance, acts to correct such fluctuation in welding voltage as may occur.

If welding is to be conducted by the method disclosed in United States Patent 2,043,960, it is necessary that the position of the electrode 12 with respect to the workpiece electrode 13 be adjustable before welding commences, because of the non-conducting properties of the comminuted welding medium employed in that method. To start such welding operations it is customary to insert a "fuse" such as a wad of steel wool between the fusible electrode and the workpiece electrode. The position of the electrodes with respect to one another must be carefully regulated during starting. In the control system of the invention, therefore, provision is made for such adjustment using a circuit separate from the welding circuit. The armature of the motor 15 is connected through the reversing switch 14 into both the welding circuit and the initial electrode adjustment circuit, the latter of which is connected to a suitable separate source of electricity. A two point make and break switch 24 serves to close the electrode adjustment circuit and to open the welding circuit before welding operations commence. By closing the reversing switch 14 in one direction and making the electrode adjustment circuit, the electrode 12 may be "inched" toward the workpiece electrode 13. By closing the reversing switch 14 in the reverse direction, the armature connections of the motor 15 are reversed, and the electrode 12 may be inched away from the workpiece electrode 13. When the position of the electrodes with respect to each other is correct, the initial adjustment circuit is broken and the welding circuit made by the make and break switch 24, and welding is then commenced.

Although particular reference has been made to the use of the control system of the invention in automatic welding operations of the type disclosed in United States Patent 2,043,960, its usefulness is not limited to operations of that type. Although alternating current circuits are shown in the drawing, the system may be used for either alternating or direct current welding. If it is to be used exclusively for alternating current operations, the variable resistance 21 may be replaced with an adjustable transformer.

We claim:

1. In an automatic electric welding system, a consumable welding electrode and a workpiece electrode movable relatively to one another; means for feeding said welding electrode toward said workpiece electrode as the former is consumed; a source of electric current connected to said electrodes to cause an electrical discharge therebetween; and a series motor operatively associated with said feeding means, said motor being connected across said electrodes.

2. In an automatic electric welding system, a consumable welding electrode and a workpiece electrode movable relatively to one another; means for feeding said welding electrode toward said workpiece as the former is consumed; a source of electric current connected to said electrodes to cause an electrical discharge therebetween; a series motor operatively associated with said feeding means, said motor being connected across said electrodes; and a variable resistance connected in series with said motor.

3. Welding apparatus comprising, in combination, a consumable welding electrode and a workpiece electrode movable relatively to one another; a transformer for supplying alternating electric welding current to said electrodes; driving rolls for feeding said consumable welding electrode toward said workpiece electrode; a series wound motor operatively associated with said driving rolls and connected across said electrodes; a variable resistance connected in series with said motor; and means protecting said motor from over-voltage produced by open circuit voltage of said transformer.

HARRY E. KENNEDY.
MAYNARD A. ROTERMUND.